Aug. 14, 1934.   J. McCLURE   1,970,468
TIRE PRESSURE INDICATOR
Filed June 23, 1933   2 Sheets-Sheet 1
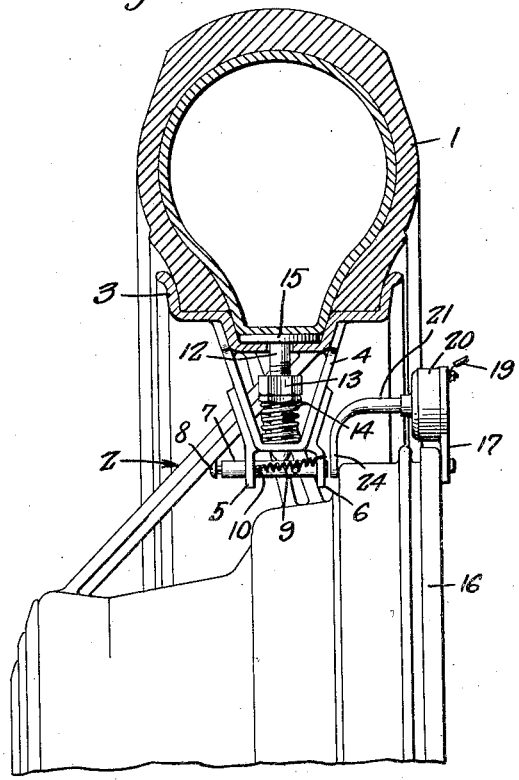
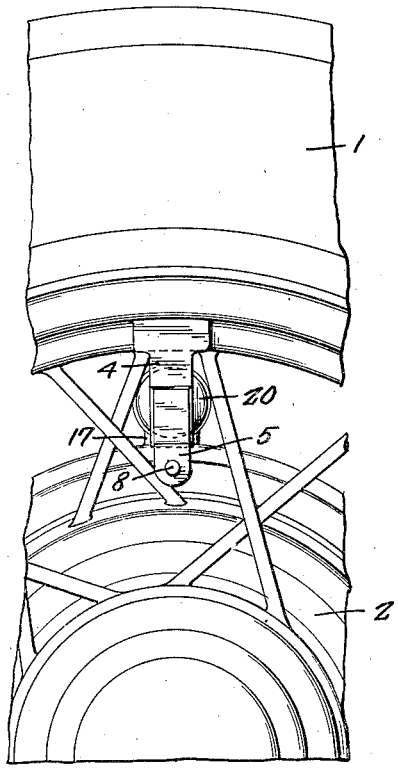
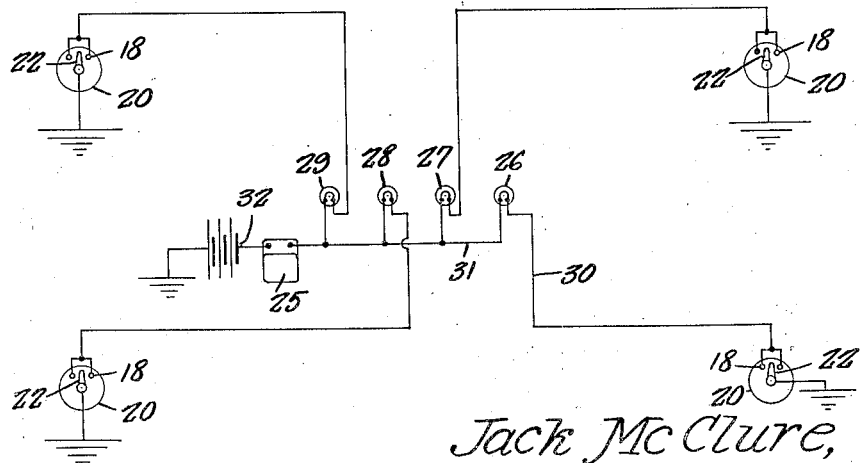
Jack McClure,
INVENTOR
BY Victor J. Evans & Co.
ATTORNEY
P. L. Hickey
WITNESS:

Aug. 14, 1934.  J. McCLURE  1,970,468
TIRE PRESSURE INDICATOR
Filed June 23, 1933  2 Sheets-Sheet 2

Jack McClure,
INVENTOR
BY Victor J. Evans & Co.
ATTORNEY

WITNESS:

Patented Aug. 14, 1934

1,970,468

UNITED STATES PATENT OFFICE 1,970,468

TIRE PRESSURE INDICATOR

Jack McClure, Poteau, Okla., assignor of fifty-five per cent to N. Preston Wood, Poteau, Okla.

Application June 23, 1933, Serial No. 677,326

1 Claim. (Cl. 200—58)

This invention has for its object the provision of means whereby the operator of a vehicle equipped with pneumatic tires may be automatically informed when a tire is deflated.

A further object of the invention is to provide means whereby the operator will be notified not only that a tire has been deflated or is being deflated but will also be notified which tire is losing its inflation.

The invention also seeks to provide mechanism for the stated purpose which will be simple and compact and will operate automatically as the wheels of the vehicle rotate.

The objects of the invention are attained in such a device as is illustrated in the accompanying drawings and the invention resides in certain novel features which will be hereinafter fully described and set forth.

In the accompanying drawings:—

Figure 1 is a transverse section of a wheel with a mechanism embodying the invention applied thereto.

Figure 2 is a side elevation of the same.

Figure 8 is a diagram.

Figure 3:
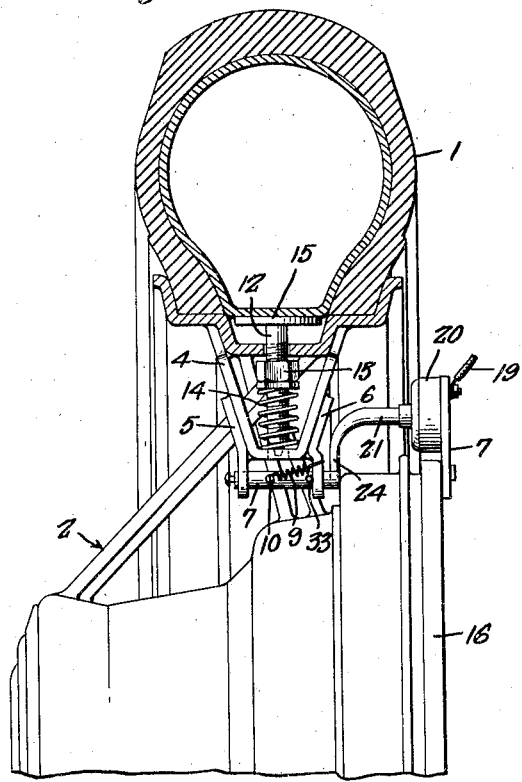
Figure 3 is a view similar to Figure 1 but showing a different position of the parts.

In the drawings, the numeral 1 denotes a pneumatic tire which is mounted upon a wheel 2 which may be of any known or approved design.

In carrying out the present invention there is secured to the rim 3 of the wheel at a point diametrically opposite the inflation valve a U-shaped frame consisting of an arch-like member 4 and side arms or extensions 5 and 6 secured to the sides of the arch and projecting beyond the top or inner end thereof. At this point it may be noted that the drawings show the tire and this invention at the top of the wheel but, of course, as the wheel rotates the attached devices will at times be at the bottom of the wheel but for convenience in describing the invention the terms "top" and "bottom" or "in" and "out" will refer to the position as illustrated, the term "in" or "inner" referring to that side of the wheel which is presented to the body of the vehicle. The inner arm 6 is offset somewhat, as shown in the drawings, whereby it will present a firm support for a sliding member 7 which is fitted through the lower ends of the arms 5 and 6.

Figure 4:
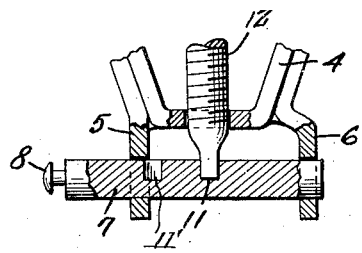
Figures 4 and 5 are enlarged sections showing different positions of the working mechanism.
Figure 5:
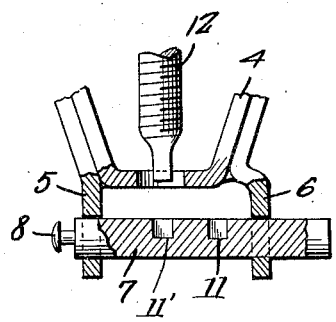
Figure 6:
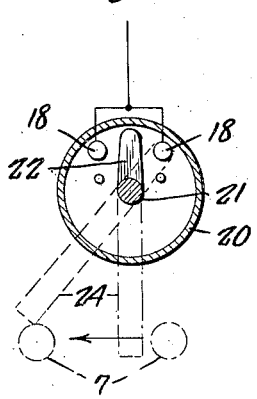
Figure 6 is an enlarged diagrammatic view of a switch which may be employed.

This sliding bar 7 is of non-circular cross section whereby it will remain in proper position in the supporting arms and will not turn therein. The outer end of the slide is equipped with a knob 8 of any desire design so that it may be drawn outwardly and held against the tension of a retractile spring 9 which is attached at one end to the arm 6 and at its opposite end to the side of the bar, as clearly shown. The screw or projection 10 to which the outer end of the spring is attached will serve as a stop to limit the outward movement of the slide by impinging against the arm 5, as will be understood upon reference to Figure 1. The slide 7 is provided in its upper side, between the supporting arms 5 and 6, with a socket 11 which is normally engaged by the inner end of a releasing latch or plunger 12. The latch or plunger 12 is a bar or stem having its upper end reduced and of the same design as the socket 11 so that it may readily enter said socket and fit closely therein and hold the slide normally against the influence of the spring 9. The plunger is threaded through the greater portion of its length so that a nut or adjustable abutment 13 may be fitted thereon and an expansion spring 14 is fitted around the plunger between the nut and the end of the yoke or arch 4, as clearly shown in Figures 1 and 3. The plunger extends through openings provided therefor in the top of the arch or yoke and in the rim 3 respectively so that the outer end of the plunger will be disposed to engage the inner tube of the tire, being equipped with a presser plate 15 preferably of copper or other non-corrodible metal which will bear directly against the inner tube, as shown in Figures 1 and 3. The spring 14 tends constantly to move the plunger outwardly so that it will descend within the tire but when the tire is inflated the plunger will be moved away from the tire so that its head or presser plate 15 will fit closely between the rim and the inflation tube at which time the lower end of the plunger will engage the socket 11 so that the slide 7 will be retained in its outer position, shown in Figures 1 and 4. A safety socket 11' is provided in the slide 7 to be engaged by the plunger when said slide has shifted its position under the influence of the spring 9, preventing the slide 7 from moving beyond a position which would subject it to injury.

Figure 7:
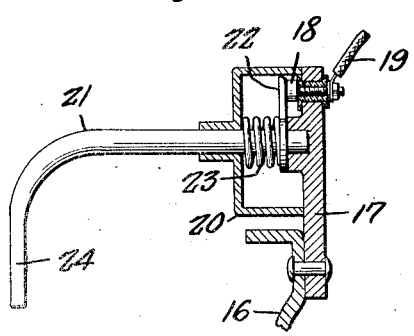
Figure 7 is a view partly in elevation and partly in transverse section of the switch mechanism.

Secured upon the brake drum support 16 of the wheel is a bracket 17 in the upper end of which is mounted an electrical contact 18 which extends through but is insulated from the bracket, as clearly shown in Figure 7, and secured to one end of this contact member is an electrical conductor 19 which extends to one side of the battery carried by the vehicle. The opposite end of the contact is disposed within a casing 20 secured upon the outer side of the bracket 17 and a switch arm 21 is journaled in said casing and in the bracket, as clearly shown in Figure 7, and carries a contact finger 22 which is adapted at times to engage the contact 18. The finger 22 will be mounted upon the switch arm 21 in such manner that it may slide along the same but will be constrained to rotate therewith and an expansion spring 23 is fitted upon the switch arm between the finger and the wall of the case 20 so that the finger will be held to the contact 18 when the circuit is to be closed. The outer end of the switch arm is turned laterally so that it constitutes a lever or crank arm, as shown at 24, so disposed that when the slide 7 is released the crank will be in the path of the end of the slide and will be actuated thereby.

The switch is of the three-point type, shown most clearly in Figure 8, so that, whether the wheel is rotating forwardly or backwardly when the device is to operate the crank arm 24 will be swung or rocked so that the finger 22 will be moved into engagement with a contact 18. When the invention is applied to a vehicle, a buzzer 25 or some other audible electrically operated signal will be mounted upon the instrument board of the vehicle and there will be also mounted upon the instrument board 4, lights 26, 27, 28 and 29 corresponding to the several wheels of the vehicle and each light will be electrically connected with the contacts 18 of one of the switches, the return to the battery being grounded through the metallic parts of the vehicle, as will be understood upon reference to Figure 8. Upon reference to Figure 8, it will be noted that all the signal lamps are in a circuit including the buzzer or other audible alarm but no two lamps are electrically connected with the same switch and consequently no two lamps will be energized simultaneously unless it should happen that the two corresponding wheels are punctured or for any other reason begin to deflate.

Referring to the signal lamp 26 for illustration, it will be noted that one side of this lamp is connected through a conductor 30 with one side of a switch and the other side of the lamp is connected by a conductor 31 to the buzzer and through the buzzer and a conductor 32 with the battery. It will also be noted that the return conductor 31 is common to all the lamps.

The nut 13 is adjusted to place the desired tension upon the spring 14 so that it will balance the pressure in the tire when the tire is fully inflated and consequently will balance or have a force slightly less than the pressure in the tire when the tire is fully inflated. When the tire is inflated, therefore, the plunger 12 will be held in engagement with the slide 7 and the parts will be in the position shown in Figures 1 and 4. Should the tire be punctured or the inflation valve leak for any reason so that the pressure within the tire is decreased, the spring 14 will expand and move the plunger outwardly so that it will move toward the interior of the tire and eventually the end of the plunger will be withdrawn from the socket 11 whereupon the spring 9 will contract and move the slide 7 inwardly until its end projects into the path of the crank arm 24, this movement being arrested by the brake drum or other part of the hub structure of the wheel, as shown in Figure 3. If deemed necessary, however, a stop lug 33 may be fitted into the side of the slide to impinge against the supporting arm 6, as indicated in Figure 3 and thereby limit the inward movement of the slide. As the rotation of the wheel continues the slide will eventually be brought against the end of the crank arm 24 so that said arm and the switch arm will be rocked and the finger 22 caused to engage one of the contacts 18 and close the circuit therethrough. Inasmuch as two contacts 18 are provided and the switch finger 22 is normally disposed between the two contacts it is obvious that whether the wheel is rotating forwardly or backwardly the circuit will eventually be closed and the signal given. The operator may then make such temporary repairs as may be possible so that it will not be necessary to drive the vehicle upon a deflated tire to the injury of the latter.

From the foregoing description, taken in connection with the accompanying drawings, it will be seen that I have provided a very simple mechanism which may be readily applied to any vehicle wheel equipped with pneumatic tires and will operate automatically and efficiently to notify the occupant of the vehicle that one or more tires is deflating.

The attachments applied to the wheels may be enclosed by suitable water and dirt proof covers removably secured in place.

Having described the invention, I claim:

An operating mechanism for tire pressure indicators comprising a substantially U-shaped frame provided with an aperture and having the ends thereof fixed to the rim of a pneumatic tire, a plunger under the influence of the air pressure of the tire and slidable in the aperture, side arms integral with the frame and projecting beyond the apertured portion thereof and provided with aligned openings, a circuit breaker operating member slidable in the openings of said side arms and having notches to be engaged by the plunger while the tire is under air pressure, an abutment adjustably secured to the plunger, a spring between the frame and the abutment to disengage the plunger from the notch on deflation of the tire, a spring connected to one of the side arms and to said member for moving the latter endwise when freed by the plunger to occupy a position for operating a circuit breaker, and a pin carried by said member and engaging with one of the side arms to prevent the movement of the member beyond said position by the action of the last-named spring.

JACK McCLURE.